UNITED STATES PATENT OFFICE 2,576,103

SYNTHESIS OF VITAMIN A ACTIVE COMPOUNDS CONTAINING REPEATED ISOPRENE UNITS

John D. Cawley, Charles D. Robeson, Edgar M. Shantz, Leonard Weisler, and James G. Baxter, Rochester, N. Y., assignors, by mesne assignments, to Eastman Kodak Company, Rochester, N. Y., a corporation of New Jersey No Drawing. Application August 30, 1947, Serial No. 771,564. In Great Britain December 24, 1946

5 Claims. (Cl. 260—617)

This invention relates to methods for synthesizing compounds containing repeated isoprene units and particularly to a method for synthetically producing vitamin A.

This invention has for its object to provide a general method for synthesizing compounds containing the isoprene grouping

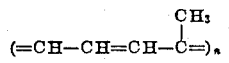

starting with an aldehyde or ketone of at least 3 carbon atoms of the type

where R and R' may be alkyl, alicyclic, aryl or heterocyclic radicals and R' may also be hydrogen. A further object is to provide a method for the synthesis of vitamin A. A still further object is to provide a method for the synthesis of compounds similar to vitamin A in molecular structure. A further object is to provide a synthetic product resembling vitamin A in properties. Another object is to improve the state of the art. Further objects will appear hereinafter.

We have discovered procedures whereby isoprene units may be added to aldehydes and ketones and further procedures whereby the resulting products are converted to various useful compounds including, in particular instances, compounds resembling vitamin A in chemical, physical and biological properties.

In accordance with the present invention, isoprene units are added at the carbonyl structure of the aldehydes and ketones by the following series of reactions.

REACTION 1

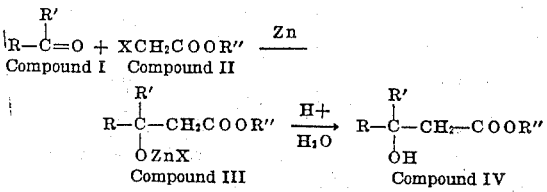

REACTION 2

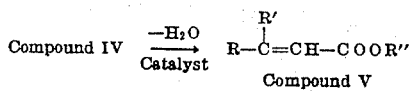

REACTION 3

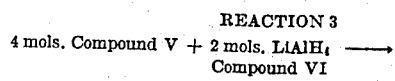

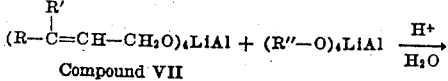

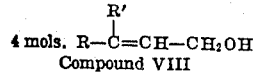

REACTION 4

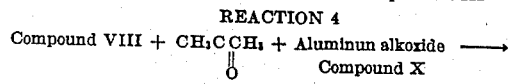

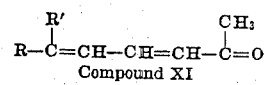

The selected aldehyde or ketone is first subjected to the Reformatsky reaction employing a haloacetate in which the halogen is chlorine, bromine, or iodine. Fluoroacetates are less satisfactory. The resulting hydroxy ester is dehydrated by the application of heat with or without the aid of a dehydration catalyst to give a corresponding dehydrated ester.

The dehydrated ester is then reduced with an aluminum-containing hydride such as lithium aluminum hydride (sometimes called lithium aluminohydride) or aluminium hydride to give the corresponding alcohol. This alcohol in turn is converted to a ketone by reacting it with excess acetone in the presence of an aluminum or magnesium alkoxide in accordance with the Oppenauer reaction.

It will be observed that Compound XI is an isoprenolog of Compound I. We have found that when the sequence of Reactions 1–4 is repeated $n$ times the $n$th isoprenolog of compound I will have the general formula

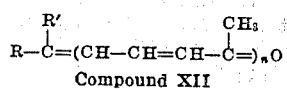

From Compound XII many compounds useful as pharmaceuticals, dyes, and perfumes may be synthesized. These have the general formula:

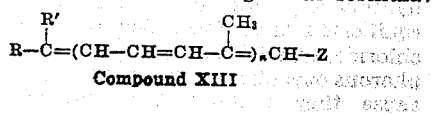

where Z may be: (1) a carbalkoxy (or by saponification a carboxy) group by applying reactions 1 and 2; (2) a —CH$_2$OH group, by applying Reaction 3 to the compound obtained in (1).

In Reaction 1 it is preferable to use a solvent such as benzene, xylene, or toluene. In all the foregoing compounds, R is a hydrocarbon radical such as —CH$_3$, —C$_2$H$_5$, etc., and R' is a hydrogen atom or a hydrocarbon radical such as —CH$_3$, —C$_2$H$_5$, —C$_8$H$_{17}$, —C$_6$H$_5$, etc. Compound I should contain at least three carbon atoms.

The following is a list of some ketones and aldehydes which are suitable as starting materials:

| | |
|---|---|
| Butyraldehyde | Acetone |
| Valeraldehyde | Methyl propyl ketone |
| Caproaldehyde | Diethyl ketone |
| Heptaldehyde | Dipropyl ketone |
| Octaldehyde | Butyl methyl ketone |
| Capraldehyde | Ethyl propyl ketone |
| Lauraldehyde | Benzophenone |
| Palmitaldehyde | Cyclohexanone |
| Benzaldehyde | Acetophenone |
| Furfural | Dibenzyl ketone |
| Nonaldehyde | Benzyl phenyl ketone |

Compounds I and II together with finely divided zinc or, less frequently, magnesium, are heated to reflux temperature until a reaction commences. The presence of a crystal of iodine is helpful in starting the reaction. When the reaction is complete the mixture is preferably cooled and an aqueous solution of acid is added. After separating the aqueous layer from the mixture the solvent may be boiled off leaving a residue of crude Compound IV. This crude compound may be further purified by processes such as molecular distillation, solvent extraction, or chromatographic adsorption.

In the foregoing compounds, X is preferably chlorine, bromine, or iodine and R" is a hydrocarbon group such as —CH$_3$, —C$_2$H$_5$, —C$_8$H$_{17}$, —C$_6$H$_5$, etc. As used in the specification and claims the term "haloacetates" includes only chloro-, bromo-, and iodo-acetates.

It can be seen that R" is a portion of the ester molecule which separates upon reduction. Since this part of the molecule never becomes part of the isoprene grouping but is separated from the reaction mixture after it has been reduced it is not of limiting significance. We prefer to have this part of the molecule a short-chain radical such as a methyl or ethyl since the reaction proceeds more rapidly with such a radical. However, the reaction will take place with more complex radicals such as benzyl, octyl, palmityl, and the like. We therefore consider that R" may be either a long-chain or a short-chain hydrocarbon radical.

In Reaction 2 Compound IV is dehydrated to give an ester, Compound V. Unless a catalyst is used, Compound V forms only about 10% or less of the reaction products the remainder being principally an isomer. It has been discovered that by catalysis this isomer can be converted to give a considerably increased yield of Compound V. By heating Compound IV in the presence of catalysts such as zinc chloride, p-toluene sulfonic acid, iodine, phosphorus oxychloride, oxalyl chloride, phosphorus trichloride, dimethylaniline hydroiodide, and other analogous catalysts, equilibrium is reached. Iodine, phosphorous trichloride, dimethylaniline hydroiodide, and phosphorous oxychloride are preferred as catalysts because they produce minimum decomposition.

After isomerization Compound V may be separated from its isomer by distillation, chromatographic adsorption, or solvent extraction. The isomer may then be reprocessed by contacting with a catalyst to set up a new equilibrium with Compound V.

In Reaction 3 Compound V is refluxed with lithium aluminum hydride (Compound VI) or aluminum hydride in the presence of solvent such as an ether or dioxane to form Compound VII which is not isolated. A hydrogen donor, such as aqueous acid, is then added to convert Compound VII to Compound VIII.

The aqueous layer is separted from the solvent layer, the solvent is dried by adding a hygroscopic material, and the solvent is evaporated to give Compound VIII.

In Reaction 4 Compound VII is refluxed for an extended period of time, e. g. of the order of 2–24 hours, with acetone and an aluminum or magnesium alkoxide in the presence of a solvent such as benzene, toluene, or xylene. After the mixture is cooled, aqueous acid is added and the mixture is then extracted with ether. After separating the aqueous layer, the solvent is evaporated to give Compound XI in crude form. This compound may be purified by chromatographic adsorption, distillation or extraction.

The invention exemplified by the above combination of steps provides a commercially practicable method of synthetically producing vitamin A. In this method β-ionone is subjected to Reactions 1–4 in sequence and Reactions 1, 2, and 3 are then repeated in sequence to produce vitamin A alcohol. This series of seven steps may be illustrated as follows, wherein R and R' of the above general formulae are the hereinbelow indicated portions of the β-ionone structure:

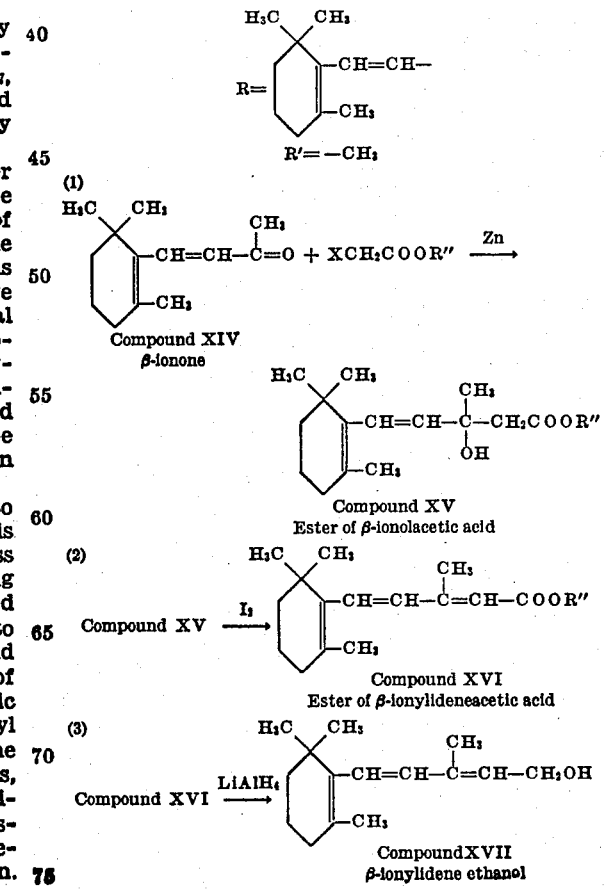

(4) Compound XVII $\xrightarrow{\text{Acetone +}}$
$\xrightarrow{\text{Al isopropoxide}}$

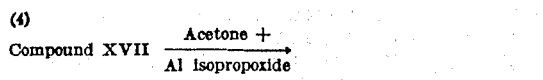

Compound XVIII (5) Compound XVIII + XCH₂COOR'' $\xrightarrow{\text{Zn}}$

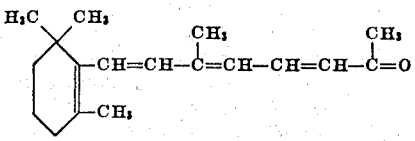

Compound XIX
Ester of α-hydro-β-hydroxy vitamin A acid (6) Compound XIX $\xrightarrow{I_2}$

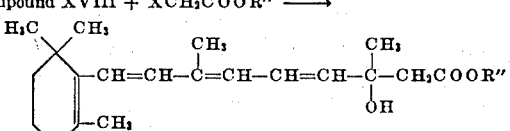

Compound XX
Ester of vitamin A acid (7) Compound XX $\xrightarrow{\text{LiAlH}_4}$

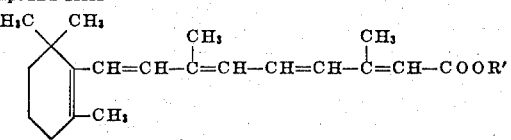

Compound XXI

Compound XXI is vitamin A also at times termed vitamin A alcohol. It may be converted to a more stable form by esterification to vitamin A acetate, vitamin A palmitate, etc. and usually will be prepared for the market in the ester form.

Compound XXI may exist in cis-transform as follows:

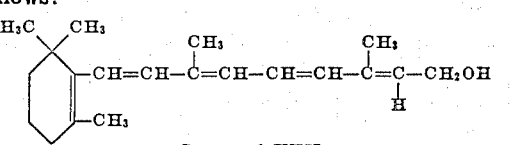

Compound XXII
Vitamin A

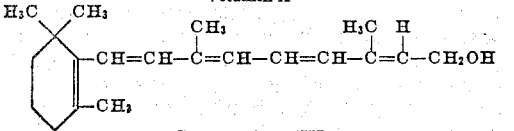

Compound XXIII
Neovitamin A

Synthetic Compound XXI consists of Compounds XXII and XXIII is about 2:1 ratio. Compounds XXII and XXIII possess equal vitamin A activity. They may be separated from each other in a manner to be described hereinafter.

Another example of the addition of isoprene units to a ketone is the following starting with allyl acetone:

(1)

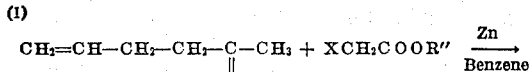

(2)

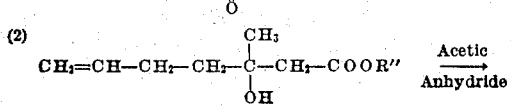

(3) 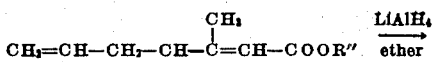

(4) 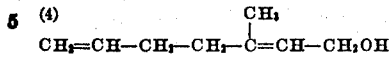

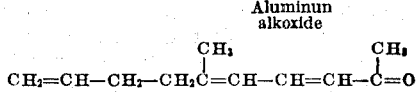

In Reaction 1 X is a chlorine, bromine, or iodine atom and R'' is a hydrocarbon group such as CH₃, C₂H₅, C₈H₁₇, C₆H₅, etc. In Reaction 4 magnesium alkoxides may be used interchangeably with aluminum alkoxides.

The following series of reactions illustrates the application of our invention to an aldehyde such as propionaldehyde.

(1) $CH_3CH_2-CHO + XCH_2COOR'' \xrightarrow[\text{Benzene}]{\text{Zn}}$ (2) 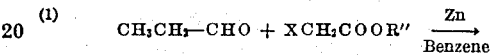 $\xrightarrow[\text{Anhydride}]{\text{Acetic}}$ (3) $CH_3-CH_2-CH=CH-COOR'' \xrightarrow[\text{ether}]{\text{LiAlH}_4}$ (4) $CH_3-CH_2-CH=CH-CH_2OH \xrightarrow[\text{alkoxide}]{\text{Acetone} \atop \text{Aluminum}}$

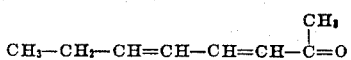

In Reaction 1 above X is a bromine or iodine atom. The Reformatsky reaction involving short-chain ketones and aldehydes such as acetaldehyde and acetone does not go rapidly with all haloacetates. As the chain length increases the reaction goes more readily and in the case of propionaldehyde, bromoacetates and iodoacetates are preferred, while chloroacetates are less satisfactory. In Reaction 1 above R'' may be a hydrocarbon group such as CH₃, C₂H₅, C₆H₅, etc. In Reaction 2 acetic anhydride may be used as the dehydration catalyst without occasioning undue destruction of the molecule. In Reaction 4 magnesium alkoxides may be satisfactorily employed instead of aluminum alkoxides.

The following specific examples illustrate the preparation of isoprenologs of β-ionone, allyl acetone, and propionaldehyde in accordance with the invention:

*Example 1.—Preparation of vitamin A (Compound XXI) from β-ionone*

Preparation of Compound XV.—96 g. (0.5 mole) β-ionone, 96 g. (0.575 mole) ethyl bromoacetate, 37.6 g. (0.575 atom) zinc dust, 250 ml. benzene, and a crystal of iodine were heated to refluxing until a reaction commenced. When the spontaneous evolution of heat had ceased the mixture was refluxed 30 min., cooled, shaken with excess 5% hydrochloric acid, and the benzene layer washed successively with water and dilute sodium bicarbonate solution. After drying over sodium sulfate, the benzene was evaporated, and the residue of crude Compound XV distilled in a cyclic molecular still to give essentially pure Compound XV as a pale yellow viscous oil.

$E_{1cm}^{1\%}$ (231 mμ) = 200

Preparation of Compound XVI.—Compound XV (14.8 g.) was dissolved in benzene (65 cc.), a small crystal of iodine was added, and the mixture refluxed for 30 minutes. The benzene solution was washed successively with dilute sodium thiosulfate solution and water, dried, and the solvent evaporated. Compound XVI when purified had absorption maxima at 256 m$\mu$ and 304 m$\mu$ with extinction coefficients of 450 and 552 respectively.

*Preparation of Compound XVII.*—4.6 g. (0.0175 mole) of Compound XVI were dissolved in 60 ml. of dry ether, and 50 ml. of a 0.4 N ethereal solution of lithium aluminum hydride was added over a period of 2 min. After stirring 5 additional minutes, 100 ml. of 5% hydrochloric acid was added, and the ether layer washed with water, dried, and evaporated, to give 4.0 g. of product, $$E_{1\,cm.}^{1\%} (277 \text{ m}\mu) = 620$$

A subsequent purer preparation of $\beta$-ionylidene ethanol had an extinction coefficient of 534 at 265 m$\mu$.

*Preparation of Compound XVIII.*—3.0 g. of Compound XVII prepared as above were refluxed 20 hours. with 40 ml. of acetone, 60 ml. of benzene, and 6.0 g. of aluminum isopropoxide. The mixture was cooled, poured into 150 ml. of 5% HCl, washed successively with 5% HCl, sodium bicarbonate, and water. The ether was dried and evaporated to give Compound XVIII admixed with unreacted Compound XVII and other impurities. It was purified by chromatographing on Doucil, a sodium aluminum silicate, from petroleum ether solution, and had $$E_{1\,cm.}^{1\%} (343 \text{ m}\mu) = 660$$

A subsequent purer preparation of Compound XVIII had $$E_{1\,cm.}^{1\%} (345) = 1056$$

The semicarbazone melted at 188–189°, and had $$E_{1\,cm.}^{1\%} (344 \text{ m}\mu) = 1630$$

*Preparation of Compound XIX.*—3.1 g. of Compound XVIII, 2.5 g. of ethyl bromoacetate, 1.0 g. of zinc, and 15 ml. of benzene were reacted and the reaction mixture worked up as described above. After dehydration, Compound XIX was separated from impurities by chromatographing from petroleum ether on Doucil, a sodium aluminum silicate. Compound XIX was obtained as an orange oil, $$E_{1\,cm.}^{1\%} (349 \text{ m}\mu) = 814$$

*Preparation of vitamin A (Compound XXI).*— 0.75 g. of Compound XIX was treated with lithium aluminum hydride as described above. The crude product had $$E_{1\,cm.}^{1\%} (325-8 \text{ m}\mu) = 825$$

With antimony trichloride in chloroform, the crude product gave a blue color identical to that given by natural vitamin A, $$E_{1\,cm}^{1\%} (620 \text{ m}\mu) = 1830$$

The biopotency indicated for the crude product by this value of extinction coefficient is 1,250,000 U. S. P. units/gram. This potency was confirmed by bioassay.

On treatment of the crude product with anhydrous alcoholic hydrogen chloride, the triplet bands at 351, 371, and 392 m$\mu$, characteristic of anhydro vitamin A, appeared, $$E_{1\,cm.}^{1\%} (371 \text{ m}\mu) = 985$$

When the crude product was purified by chromatographic adsorption and crystallized from ethyl formate solution, the crystals had a melting point (60–61°) similar to that of crystalline vitamin A which has been described in the literature (Baxter and Robeson, J. A. C. S. 64, 2411 (1942)).

The foregoing tests afford a basis for concluding that our product is substantially the same as natural vitamin A since it has substantially the same absorption maximum, gives substantially the same color reaction with antimony trichloride, has substantially the same biopotency, and is transformed by treatment with anhydrous alcoholic hydrogen chloride into a derivative having substantially the same ultra violet absorption characteristics as anhydro vitamin A.

*Separation of neo-vitamin A (Compound XXIII) from vitamin A (Compound XXII)*

Crystallization to remove vitamin A.—A synthetic concentrate $$(4.25 \text{ g. } E_{1\,cm.}^{1\%} (328 \text{ m}\mu) = 1325)$$

purified by chromatographing on sodium aluminum silicate was dissolved in 30 cc. of ethyl formate and cooled to −80° C. After cooling the solution to −80° C. for 2 days, the solution was seeded with a few crystals of vitamin A alcohol. In two days at −80° C. the precipitation of vitamin A was complete and the crystals were removed by filtration.

*Preparation of neo-vitamin A and azo benzene carboxylates.*—The filtrate residue was freed of ethyl formate by distillation under vacuum and the residue $$(2 \text{ grams, } E_{1\,cm.}^{1\%} (328 \text{ m}\mu = 1150))$$

was dissolved in Skelly Solve a petroleum ether to make 15 cc. of solution which was chromatographed on a column (20 mm. diameter) of Doucil a sodium aluminum silicate (30 gms.) and washed with additional Skelly Solve until a yellow-orange zone reached the bottom of the column. The column was removed in four equal sections which were separately eluted with ethyl ether containing 5% methyl alcohol. Thus, there was obtained five fractions as shown in Table I.

TABLE I

| Fraction | Blank | eight, Gr. | $E_{1\,cm.}^{1\%}$ (328 m$\mu$) | Per Cent Neo Vitamin A |
|---|---|---|---|---|
| 1 | S. S. Filtrate | .25 | 800 | 75 |
| 2 | | .87 | 1,040 | 66 |
| 3 | Four 1-inch Sections of Columns. | .35 | 1,430 | 50 |
| 4 | | .31 | 1,330 | 28 |
| 5 (Top) | | .21 | 1,350 | |

Fractions 1 and 2 from the first chromatograph were rechromatographed on Doucil (15 gms.) and well washed with additional Skelly Solve. Elution of the bottom half of the column with ether containing 5% methyl alcohol yielded a fraction (.49 gm. I) with $$E_{1\,cm.}^{1\%} 328 \text{ m}\mu = 1275$$

which contained approximately 85% neo-vitamin A. To this neo-vitamin A concentrate (.49 gms.), in methylene chloride (3 cc.) and pyridine (0.5 cc.) was slowly added azo benzene carboxyl chloride (.425 gms.) in methylene chloride (3 cc.). After standing 5 hours at room temperature, water (0.1 cc.) was added and the reaction mixture warmed to 50° to hydrolyze any excess acid chloride. The methylene chloride solution was then poured into 5% HCl (20 cc.) and extracted with ether (30 cc.). The ether extract was washed with 5% HCl to remove pyridine, N/5 KOH, and finally with water to neutrality. The solvent was evaporated after drying by filtration through sodium sulfate yielding a red oil (.85 gm.). Skelly Solve (10 cc.) was added and the solution filtered and washed through a column of Doucil to remove the azoic anhydride with which the product was contaminated. The Skelly Solve filtrate and washings were concentrated to 7.5 cc. and cooled to −35° C. which caused crystallization of the neo-vitamin A azo benzene carboxylate (.31 gm.).

After two recrystallizations of the ester from Skelly Solve at 25°, the orange crystals (0.135 gm., II) were dried under vacuum, feathery needles, melting point 94–96° C.;

$$E^{1\%}_{1\,cm.}\,330\,m\mu = 1460$$

A depression of melting point occurred when mixed with a sample of vitamin A azo benzene carboxylate.

Neo-vitamin A azoate (0.1 gm.) was dissolved in 10 cc. of boiling alcohol, and 0.4 cc. of 4 N alcoholic KOH was added. The mixture was refluxed for 15 minutes. After pouring into water (5.0 cc.) and extracting with ether (10 cc.) the ether extract was washed with N/5 KOH and water, dried over sodium sulfate, filtered and evaporated to yield neo-vitamin A as a viscous yellow oil (.06 gm.) which crystallized from ethyl formate (.2 cc.) at −35°. The pale yellow needles of neo-vitamin A were filtered and dried under vacuum M. P. 59–60°;

$$E^{1\%}_{1\,cm.} = 1645$$

When mixed with vitamin A (M. P. 62–64°) a depression in the melting point to approximately 54° was observed.

The data on rates of dehydration show that the neo-vitamin A in alcohol form is more stable to acid than known vitamin A and that the ester is more stable to action of alcohols than the same ester of known vitamin A.

The vitamin A azo benzene carboxylate mentioned above was prepared from crystalline vitamin A M. P. 62–64° C. and azo benzene carboxyl chloride using the procedure as described for neo-vitamin A azo benzene carboxylate. Reddish orange prisms melting point 79.5–80°;

$$E^{1\%}_{1\,cm.}\,330\,m\mu = 1460$$

Anthraquinone B carboxylate of neo-vitamin A is prepared as follows: To a solution of neo-vitamin A (0.15 g.) in methylene chloride (1 cc.) and pyridine (0.2 cc.) was added a solution of anthraquinone B-carboxyl chloride (0.15 g.) in benzene (4 cc.). After standing at 25° for four hours, the esterification mixture was poured into 5% HCl (15 cc.) and extracted with ether (20 cc.). The ether extract was washed with 5% HCl to remove pyridine, N/5 KOH, and finally with water to neutrality. Evaporation of the solvent yielded a red viscous oil 6.2 g.) which crystallized from acetone (2 cc.) at 0°. Recrystallization from acetone at 25° yielded red rosette like crystals M. P. 130–131° C.

Substitution of vitamin A for neo-vitamin in the above procedure yielded yellow plate-like crystals. M. P. 123–124° C.

Example 2.—Addition of an isoprene unit to allyl acetone

*Preparation of allyl acetone.*—Allyl acetone was prepared by the saponification and decarboxylation of allylacetoacetic ester. The overall yield of final distillate, boiling point 120–121, was 47%. The sequence of reactions is as follows:

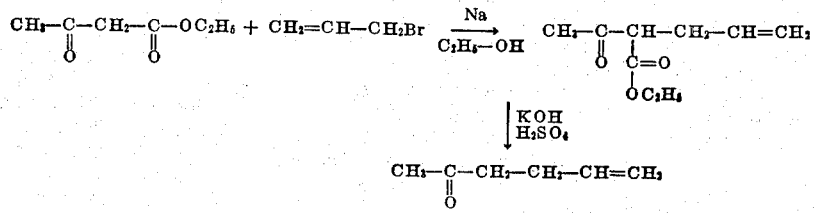

*Reformatsky condensation of allyl acetone.*—46 g. of the prepared allyl acetone (0.47 mole) in 150 cc. of benzene and 32.5 g. of 80-mesh zinc (0.5 mole) was placed in a 3-neck flask equipped with stirrer, condenser and dropping funnel. 85 g. of bromoethylacetate in 150 cc. of benzene was placed in the dropping funnel and ⅓ of this solution added to the flask. On heating a vigorous reaction set in and the remaining bromoacetate solution was added at a rate to keep up the reflux over a period of 30 minutes. The mixture was then refluxed 30 minutes longer and worked up by hydrolysis with 5% hydrochloric acid, washing and drying. Yield 87 g. of yellow oil.

EQUATION

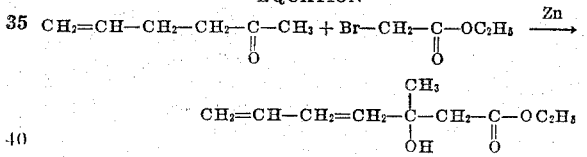

*Dehydration of Reformatsky product.*—30 g. of the hydroxy ester solution was treated with 30 g. acetic anhydride in a steam bath for 1½ hours and the solvent evaporated. The infra red spectrum of the product (26.5 g.) showed no OH band.

*Reduction of the unsaturated ester.*—4.7 g. of the ester was reduced with 5 cc. of a 1 molar solution of lithium aluminum hydride in the manner described in Example 1. A dark brown oil was obtained as a product which showed a strong OH band in the infra red and which had a strong perfume odor of new mown hay.

EQUATION

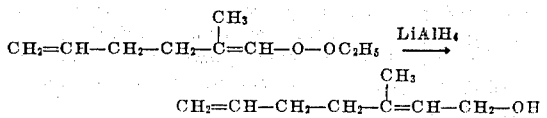

*Oxidation of the unsaturated alcohol.*—3 g. of the alcohol was condensed with 10 cc. of 10% aluminum isopropoxide in benzene and 30 cc. of acetone at reflux temperature for 15 hours. The oil obtained gave a ketone test with dinitrophenyl hydrozine.

EQUATION

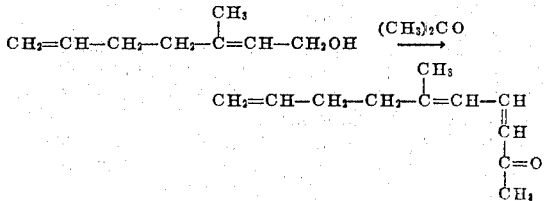

Example 3.—Preparation of an isoprenolog of propionaldehyde

*Reformatsky condensation of propionaldehyde.*—29 g. of propionaldehyde (0.5 mole) 175 cc. of benzene and 32.5 g. of 80-mesh zinc (0.5 mole) is placed in a 3-neck flask equipped with a stirrer, condenser, and dropping funnel. 85 g. ethyl bromoacetate and 175 cc. of benzene is placed in the dropping funnel and ⅓ of this solution added to the 3-neck flask. The mixture is agitated while being slowly heated. As soon as the reaction begins the remaining bromoacetate solution is added at a rate sufficient to maintain the refluxing of the mixture over a period of 30 minutes. The mixture is then refluxed for an additional 30 minutes. After cooling the mixture is placed in a separatory funnel and 300 cc. of 5% hydrochloric acid are added. The aqueous layer is separated to leave a benzene solution of hydroxy ester.

*Dehydration.*—The benzene solution of hydroxy ester is treated with 40 g. of acetic anhydride and refluxed for 90 minutes. The benzene solution is then washed successively with aqueous sodium carbonate solution in water, dried, and the solvent evaporated.

*Reduction of ester.*—6 g. of the ester obtained above dissolved in 50 ml. of dry ether and 50 ml. of a 0.05 N ether solution of lithium aluminum hydride are added with agitation over a period of 2 minutes. After stirring 5 minutes 100 ml. of 5% hydrochloric acid are added and the ether layer washed with water, dried, and evaporated, to yield an alcohol.

*Oxidation of the alcohol.*—The alcohol prepared above is refluxed 20 hours with 40 ml. of acetone, 60 ml. of benzene, and 7 g. of aluminum tertiary butoxide. The mixture is cooled, poured into 150 ml. of 5% hydrochloric acid, and extracted with ether. The ether solution is washed successively with dilute HCl, sodium bicarbonate, and water. The solution is evaporated to give crude

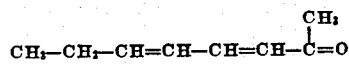

an isoprenolog of propionaldehyde.

It will be observed that starting with a ketone or aldehyde, the compounds produced by the successive steps of our invention are (1) a hydroxy ester having in the portion of the ester molecule derived from the acid two more carbon atoms than were present in the original aldehyde or ketone, (2) an ester having two more carbon atoms in the acid portion of the molecule than the original aldehyde or ketone, (3) an alcohol having 2 more carbon atoms in the molecule than the original aldehyde or ketone, and (4) a ketone having 5 more carbon atoms in the molecule than the original aldehyde or ketone.

Our invention contemplates going through the above series of Reactions 1 through 4 at least once but thereafter, although the sequence must be maintained, it is not necesary to complete the sequence in its entirety. Thus, in Example 1, vitamin A was produced from β-ionone by going through the above sequence as follows:

(1), (2), (3), (4), (1), (2), (3)

In Example 2 starting with allyl acetone, and in Example 3 starting with propionaldehyde, single isoprene units were added by going through the above 1–4 sequence once only. Our invention includes treating aldehydes and ketones by the (1), (2), (3), (4) sequence of reactions at least once. Our invention further contemplates repeating the (1), (2), (3), (4) sequence, or fractions thereof, and the products produced thereby are regarded as coming within the scope of our invention.

While the invention has been described in considerable detail with reference to certain exemplary procedures and materials, it will be understood that modifications and variations therein may be effected without departing from the spirit and scope of the invention as it is defined by the appended claims.

What we claim is:

1. The process of synthesizing vitamin A from β-ionone which comprises converting β-ionone to β-ionolacetic acid ester by reacting β-ionone with a haloacetate in the presence of a metal catalyst selected from the class consisting of zinc and magnesium and hydrolyzing the product of said reacting with aqueous acid, dehydrating said β-ionalacetic acid ester to β-ionylidene acetic acid ester, reducing said β-ionylidene acetic acid ester to β-ionylidene ethanol by reacting said β-ionylidene acetic acid ester with an aluminum-containing hydride selected from the class consisting of lithium aluminum hydride and aluminum hydride and hydrolyzing the resulting product, oxidizing said β-ionylidene ethanol to an eighteen carbon atom ketone by reacting said β-ionylidene ethanol with acetone in the presence of a metal alkoxide selected from the class consisting of aluminum alkoxides and magnesium alkoxides, converting said ketones to α-hydro-β-hydroxy vitamin A acid ester by reacting said ketone with a haloacetate in the presence of a metal catalyst selected from the class consisting of zinc and magnesium and hydrolyzing the product of said reacting with aqueous acid, dehydrating said α-hydro-β-hydroxy vitamin A acid ester to vitamin A acid ester, and reducing said vitamin A acid ester to vitamin A alcohol by reacting said vitamin A acid ester with an aluminum-containing hydride selected from the class consisting of aluminum hydride and lithium aluminum hydride and hydrolyzing the resulting product to vitamin A alcohol.

2. The method of synthesizing vitamin A from β-ionone which comprises in combination (1) reacting β-ionone with a haloacetate of the formula XCH₂COOR, wherein X is a halogen atom and R is a hydrocarbon radical, in the presence of a metal catalyst and thereby forming a metalloorganic addition product; (2) hydrolyzing said addition product to β-ionolacetic acid ester; (3) dehydrating said β-ionolacetic acid ester in the presence of a dehydration catalyst and thereby producing β-ionylidene acetic acid ester; (4) reducing said β-ionylidene acetic acid ester to β-ionylidene ethanol by reacting said β-ionylidene acetic acid ester with lithium aluminum hydride and hydrolyzing the resulting reaction product with aqueous acid; (5) condensing said β-ionylidene ethanol with acetone and aluminum alkoxide and thereby converting said β-ionylidene ethanol to an eighteen carbon atom ketone; and (6) subjecting said ketone to the succession of steps employed for converting said β-ionone to said β-ionylidene ethanol and thereby converting said ketone to vitamin A alcohol.

3. The process of converting β-ionone to a vitamin A active compound which comprises (1) reacting β-ionone with a haloacetate of the formula XCH₂COOR, wherein X is a halogen atom and R is a hydrocarbon radical, in the presence of a metal catalyst selected from the class consisting of zinc and magnesium; (2) hydrolyzing the resulting reaction product with aqueous acid to β-ionolacetic acid ester; (3) dehydrating said β-ionolacetic acid ester to β-ionylidene acetic acid ester; (4) reducing said β-ionylidene acetic acid ester to β-ionylidene ethanol by reacting said ester with a metal hydride selected from the class consisting of aluminum hydride and lithium aluminum hydride and hydrolyzing the resulting reaction product with aqueous acid; (5) reacting said β-ionylidene ethanol with acetone in the presence of a metal alkoxide selected from the class consisting of aluminum alkoxides and magnesium alkoxides and thereby converting said β-ionylidene ethanol to a ketone of the formula

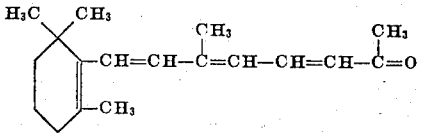

and (6) converting said ketone to a vitamin A active compound by subjecting said ketone to at least one of said foregoing steps including reacting said ketone with said haloacetate, and hydrolyzing the resulting reaction product.

4. The method of synthesizing vitamin A from β-ionone which comprises converting β-ionone to β-ionolacetic acid ester by reacting said β-ionone with a haloacetate in the presence of a metal selected from the group consisting of zinc and magnesium and hydrolyzing the resulting reaction product, catalytically dehydrating said β-ionolacetic acid ester to β-ionylidene acetic acid ester, reducing said β-ionylidene acetic acid ester to β-ionylidene ethanol by treating said ester with a metal hydride selected from the class consisting of aluminum hydride and lithium aluminum hydride and hydrolyzing the resulting product with aqueous acid, oxidizing said β-ionylidene ethanol to an eighteen carbon atom ketone by reacting said β-ionylidene ethanol with acetone in the presence of a metal alkoxide selected from the class consisting of aluminum alkoxides and magnesium alkoxides, converting said ketone to α-hydro-β-hydroxy vitamin A acid ester by reacting said ketone with a haloacetate in the presence of a metal selected from the class consisting of zinc and magnesium and hydrolyzing the resulting reaction product, catalytically dehydrating said α-hydro-β-hydroxy vitamin A acid ester to vitamin A acid ester, and reducing said vitamin A acid ester to vitamin A by reacting said vitamin A acid ester with a metal hydride selected from the class consisting of aluminum hydride and lithium aluminum hydride and hydrolyzing the resulting reaction product to vitamin A with aqueous acid.

5. The method of synthesizing vitamin A from β-ionone which comprises converting β-ionone to an alkyl ester of β-ionolacetic acid by reacting said β-ionone with an alkyl haloacetate in the presence of zinc and hydrolyzing the resulting reaction product with aqueous acid, catalytically dehydrating said alkyl ester of β-ionolacetic acid to an alkyl ester of β-ionylidene acetic acid, reducing said alkyl ester of β-ionylidene acetic acid to β-ionylidene ethanol by reacting said alkyl ester of β-ionylidene acetic acid with a metal hydride selected from the class consisting of aluminum hydride and lithium aluminum hydride in an organic solvent and hydrolyzing the resulting reaction product to β-ionylidene ethanol with aqueous acid, oxidizing said β-ionylidene ethanol to a ketone of the formula

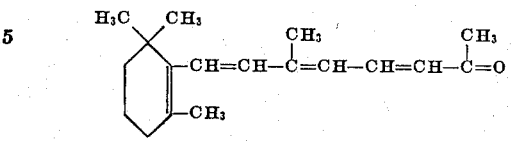

by reacting said β-ionylidene ethanol with acetone in the presence of aluminum alkoxide, converting said ketone to an alkyl ester of α-hydro-β-hydroxy vitamin A acid by reacting said ketone with an alkyl haloacetate in the presence of zinc and hydrolyzing the resulting reaction product with aqueous acid, catalytically dehydrating said alkyl ester of α-hydro-β-hydroxy vitamin A acid to an alkyl ester of vitamin A acid, and reducing said alkyl ester of vitamin A acid to vitamin A alcohol by reacting said alkyl ester of vitamin A acid with a metal hydride selected from the class consisting of aluminum hydride and lithium aluminum hydride in an organic solvent and hydrolyzing the resulting reaction product to vitamin A alcohol with aqueous acid.

JOHN D. CAWLEY.
CHARLES D. ROBESON.
EDGAR M. SHANTZ.
LEONARD WEISLER.
JAMES G. BAXTER.

REFERENCES CITED

The following references are of record in the file of this patent:

UNITED STATES PATENTS

| Number | Name | Date |
|---|---|---|
| 2,233,375 | Kuhn | Feb. 25, 1941 |
| 2,424,994 | Milas | Aug. 5, 1947 |

OTHER REFERENCES

Young et al., Jour. Am. Chem. Soc., vol. 66, 520-4 (1944).

Van Dorp et al., Rec. Trav. Chim., vol. 65, 338-345 (1946).

Milas, Jour. Am. Chem. Soc., vol. 69, 2247-8 (1947).

Nystrom et al., Jour. Am. Chem. Soc., vol. 69, 1197-9 (1947).

Batty et al., Jour. Chem. Soc., 175-9 (1938).

Brown et al., Abs. of Papers, 110th Meeting, Am. Chem. Soc., Sept. 9-13 (1946), pages 27P-28P.